April 5, 1927.

B. F. AUGUSTINE 1,623,296

TWO-CYCLE GAS ENGINE

Filed April 26, 1922 7 Sheets-Sheet 1

Inventor

Benjamin F. Augustine

By Sturtevant & Mason

Attorneys

April 5, 1927.

B. F. AUGUSTINE

1,623,296

TWO-CYCLE GAS ENGINE

Filed April 26, 1922

B. F. AUGUSTINE

TWO-CYCLE GAS ENGINE

Filed April 26, 1922

Patented Apr. 5, 1927.

1,623,296

UNITED STATES PATENT OFFICE.

BENJAMIN FRANKLIN AUGUSTINE, OF BUFFALO, NEW YORK, ASSIGNOR TO AUGUSTINE AUTOMATIC ROTARY ENGINE COMPANY, OF BUFFALO, NEW YORK, A CORPORATION OF NEW YORK.

TWO-CYCLE GAS ENGINE.

Application filed April 26, 1922. Serial No. 556,740.

The invention relates to new and useful improvements in a two-cycle engine.

An object of the invention is to provide a two-cycle engine which is constructed and timed so that the expansion and exhaust occurs on one stroke of the piston, while the charging and compression occur upon the other stroke of the piston.

A further object of the invention is to provide a two-cycle gas engine of the above type having intake and exhaust ports initially controlled by the piston.

A still further object of the invention is to provide a two-cycle gas engine having intake and exhaust ports uncovered by the pistons with means associated therewith and timed so that the exhaust and expansion of the gases takes place on one stroke of the piston while the charging and compression of the gases take place on the other stroke of the piston.

A still further object of the invention is to provide a two-cycle gas engine of the above type, wherein the exhaust port is covered by means independent of the piston and timed so as to close the exhaust port during substantially the entire period of charging and compression.

A still further object of the invention is to provide a two-cycle gas engine of the above type, wherein the intake port is uncovered by the piston and wherein auxiliary means is provided for covering said intake port, which auxiliary means is timed so as to maintain said intake port covered during the exhaust period and while said exhaust port is open.

A still further object of the invention is to provide a two-cycle gas engine having intake and exhaust ports, means for controlling said ports whereby said exhaust port is closed while the intake port is open, and said intake port is closed while the exhaust port is open.

A still further object of the invention is to provide a two-cycle gas engine of the above type with means for supplying the cylinder with fuel gases at relatively low pressure and continuously while said intake port is open.

A still further object of the invention is to provide a two-cycle gas engine of the above type, wherein the gases are supplied to each cylinder by a pump having a larger capacity than the capacity of the engine cylinder, so that a super-charge may be supplied thereto.

A still further object of the invention is to provide a two-cycle gas engine of the above type wherein there is a pump for each cylinder and the pump is timed so as to supply the cylinder with fuel gases when the intake port is open at relatively low pressure.

A still further object of the invention is to provide a two-cycle gas engine of the above type, wherein each pump for supplying the cylinders is provided with a movable piston, and said piston is provided in turn with a by-pass so disposed as to be connected with the intake port only during the charging and compression stroke of the piston of the cylinder.

These and other objects will in part be obvious and will in part be hereinafter more fully disclosed.

In the drawings which show by way of illustration one embodiment of the invention—

The invention is directed broadly to a two-cycle engine wherein the cylinders may be stationary or mounted to rotate, although I prefer to embody my invention in an engine of the rotating radially disposed cylinder type. The invention may also be embodied in an engine having a cylinder with a single piston, which cylinder is provided with intake and exhaust ports, although here again, I prefer to embody the invention in an engine which has connected twin cylinders with a piston for each cylinder, which piston and cylinder have relative movements. Then again, while the invention may be embodied in a twin cylinder engine having intake and exhaust ports controlled in various ways, I prefer a type of engine wherein the intake and exhaust ports are initially opened by the pistons. The broad invention consists in a two-cycle engine which is provided with devices arranged so that the charging of the cylinder and compression of the gases take place on one stroke of the piston, while the expansion and exhaustion of the gases takes place on the other stroke of the piston, which in effect, divides the cycle of the engine into separate and distinct periods similar to the results obtained in a four-cycle engine, and this gives ample opportunity for the hot burning gases to be exhausted from the cylinder before the new charge enters the cylinder. In the preferred form of the invention, this is accomplished by means which controls the exhaust ports, so that the exhaust ports are opened approximately sixty degrees before the pistons reach the end of their stroke, at which time the exhaust ports are closed. On the other hand, the intake ports are opened at the time when the exhaust ports are closed, so that the incoming gases will be trapped by the closed exhaust ports, which prevents any overrunning of the incoming gases and which permits the gases to be supplied in such quantity as to produce superinduction or a one-hundred percent charge regardless of atmospheric conditions.

This control of the exhaust ports in a rotating engine is preferably accomplished by the pistons, and the exhaust ports are of such dimensions that the ports begin to open sixty degrees before the piston controlling the same reaches the end of its inner stroke, and by providing auxiliary means which is operated independent of the movement of the piston for closing the exhaust port just as the piston reaches the end of its stroke. Of course, it will be understood that this specific timing stated of sixty degrees before the piston reaches the end of its stroke may be varied within certain limits and on the other hand, adjustable means may be provided for closing the exhaust port at slightly different times in order to get the best results. The timing stated is approximate.

The area of the exhaust port is of ample capacity to relieve the cylinder of the exhaust gases, which are, of course, under slight pressure, almost instantly, and the rapid rushing of the exhaust gases out through the exhaust port when it is opened, scavenges the cylinder, and as a matter of fact, produces a partial vacuum therein.

I have found by experience that this gives ample time to scavenge the cylinder of the burnt gases. I may, however, find it expedient to leave the exhaust port open for a short time during the initial entering of the charge so as to further scavenge the cylinder of any possible remaining burnt gases. This, of course, can be accomplished by slight adjustment of the auxiliary means for controlling the auxiliary cut-off for the exhaust port.

The gases are supplied to each cylinder by means of a pump, and this pump has a larger capacity than the capacity of the cylinder with which it is associated so as to insure that the cylinder will be quickly supplied to one-hundred percent or more, if desired, thus insuring a complete charge under open throttle, and a supercharge, if desired. This makes the engine very efficient when working under low atmospheric conditions, as for example, in high altitudes. I prefer to use a pump having a piston sliding relative to the pump cylinder and timed in its movements ninety degrees or thereabouts in rear of the engine piston. This enables the intake port to be held closed during the entire expansion stroke of the engine piston before the pump supplies its charge to the cylinder, and therefore, the gases will be put under little pressure in the pump before they are transmitted to the cylinder. The ports leading to and from each pump cylinder are also relatively relatively large which further provides ample clearance so as to avoid excessive pressure of the gases. The pump takes its charge directly from the carburetor and has capacity for substantially only a single charge so that the engine responds very readily to the throttle, and at the same time, I am able to supply a charge to the cylinders which is proportionate to the throttle conditions. Under full load, the cylinder will be supplied with a hundred percent charge. Furthermore, the pump works under very low pressure and therefore, there is substantially no loss through pumping under pressure, that is, due to the compression and expansion of gases before they are transferred to the cylinder.

It will also be noted that the suction port for the pump through which the charge is drawn into the pump cylinder is so disposed as to be closed by the pump piston before the intake port closes, and this enables a substantially complete discharge of the fuel gases from the pump into the cylinder. This prevents pressure on the inlet cut-off disk. It also prevents back leakage and the wasted forces due to trapping, and compression gases in the intake port for the pump. The pump pistons are each provided with a by-pass and the pump piston operates to close the intake port during the time that the intake port is opened by the relative movement of the piston of the engine cylinder on its expansion stroke and the by-pass operates to connect the chamber at the outer end of the pump cylinder with the engine cylinder during the time that the intake port is open on the charging and compression stroke of the piston of the engine. The by-pass in the pump piston is directly in rear of the portion of the piston which closes the intake port and therefore, the heat of the burnt gases aids in gasifying the charge as it enters the cylinder.

It will be noted that the compression rings at the exhaust side of the engine and in and about the relatively movable parts which conduct the exhaust gases from the cylinders to the exhaust pipe, are located in grooves in the movable parts, which grooves open outwardly so that the expansion of the ring is against the stationary part which through frictional contact prevents the ring from rotating; and therefore, the seal which is brought about by the rings extends on three sides of the ring. The rings, of course, are of such dimensions as to be apparently free in the grooves therefor.

In my prior Patent No. 1,229,569, granted June 12, 1917, I have shown and described in detail a rotary two-cycle engine, of the twin cylinder type, and wherein the cylinders are fired in the 1, 2, 3, etc., order, that is, in succession. In my co-pending application, Serial Number 430,878, filed December 15, 1920, I have shown and described an improvement in the invention set forth in said prior patent. The present invention is a still further improvement upon this same type of engine, and reference may be had to the prior patent and the pending application for a general arrangement and operation of the parts.

Figure 2:
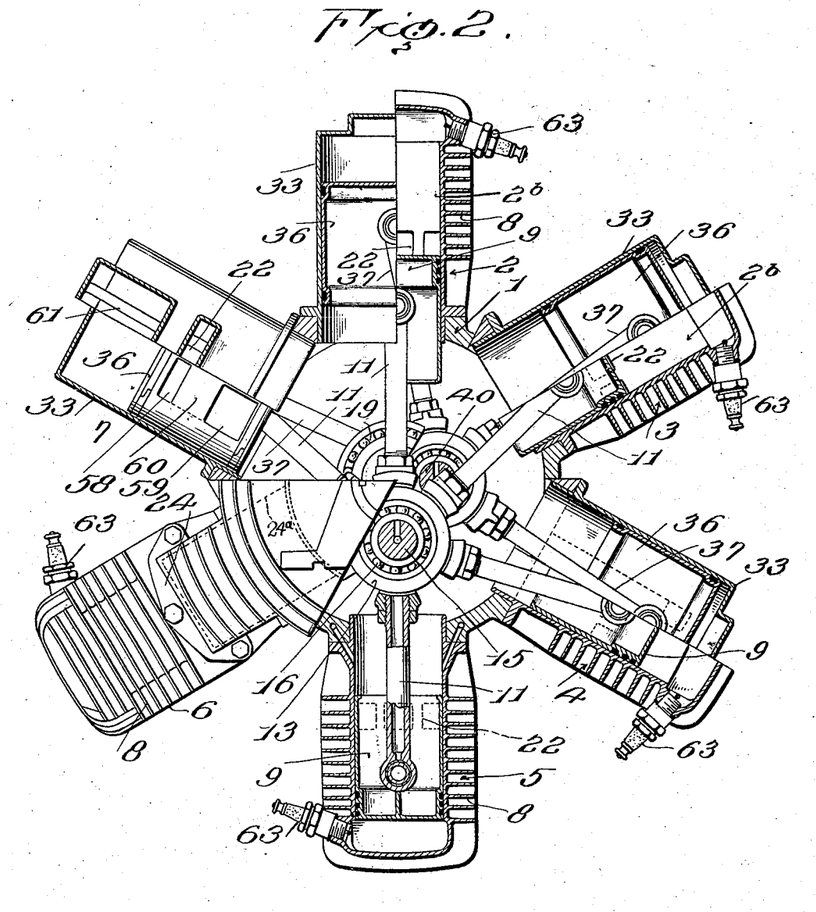
Fig. 2 is a view partly in transverse section and partly in end elevation, the sections being taken at various points of the cylinders and the pumps to aid in showing the timing of the parts.

The present engine includes a rotating casing 1 having a plurality of radially disposed twin cylinders indicated at 2, 3, 4, 5, 6 and 7 (see Fig. 2). The twin cylinder 2 includes two cylinders $2^a$ and $2^b$ which are preferably cast together, but separated so that air may pass readily between the cylinders. Between the cylinders and on the outer wall of the cylinders there are radiating fins 8. These cylinders are secured to the casing 1 and project radially therefrom and rotate with the casing. Each pair of twin cylinders are similarly constructed, and the description for one pair will answer for the others. In the cylinder $2^b$ there is a piston 9 and in the cylinder $2^a$ there is a piston 10. Connected to the piston 9 is a piston rod 11 and to the piston 10 is a piston rod 12. These piston rods are in turn connected to cross bars 13. It is understood that there is a cross bar 13 for each pair of pistons. Also connected with each bar 13 are rings 14. These rings are placed side by side and between the rings 14 and the crank 15 are a series of ball bearings 16. The crank 15 is formed integral with the shaft 17 which is stationary so that the crank is stationary, and the casing and the cylinders rotate around said crank. Said casing is mounted on a ball bearing 18 on the stationary shaft 17. There is also a ball bearing 19 between the web 20 forming a part of the casing and the section 21 which is part of the shaft 17.

The cylinder $2^b$ is provided with an intake port 22, and the cylinder $2^a$ is provided with an exhaust port 23. The intake and exhaust ports are so disposed as to be covered and uncovered by the pistons so that said ports are in part controlled by the pistons. The casing 1 is provided with a chamber 24 which is connected with the exhaust port 23 so that the exhaust gases pass out into the chamber 24. The casing containing the chamber 24 rotates. A stationary member 25 is formed with a passage 26 adapted to receive the exhaust gases from the chamber 24. Said member 25 is formed with a circular flange 27 which overlies the casing forming an outer wall of the chamber 24. Said outer wall of the chamber 24 is provided with a series of grooves, in each of which is a sealing ring 28. The member 25 also has an inwardly extending circular portion 29 and the casing 1 extends underneath this circular portion 29 and is shaped to conform thereto. The casing has a series of grooves in which are placed sealing rings 30. These sealing rings 28 and 30 fit comparatively loosely in the grooves and the grooves all open outwardly away from the axis of rotation of the casing. Any rotation of the sealing rings will tend to expand the same, and cause said rings to frictionally grip the overlying circular members 27 and 29, respectively, and this holds the rings from rotating, particularly as the rings fit loosely in their respective grooves as above noted. The result is I am able to provide sealing rings where the sealing area is on three sides of the rings.

Located within the chamber 24 is an adjustable webbed member 31 which carries an annular ring 32 adapted to close the exhaust ports. This ring 32 and the web supporting the same is stationary, but as above noted, adjustable. The ring 32 has a suitable opening as is clearly set forth in my prior application, which is at times, brought into register with the exhaust ports 23 so that the burnt gases may readily escape through the opening to the chamber 24 and out through the passage 26. The path of movement of the burnt gases is indicated by the arrow line in Fig. 3 of the drawings.

Associated with each pair of cylinders is a pump. The pumps in the preferred form of my invention are in the form of reciprocating piston pumps. The cylinders for the pump associated with the twin engine cylinders $2^a$ and $2^b$ is indicated at 33. Said cylinder is preferably cast in block with the engine cylinders, but is in part spaced slightly therefrom and provided with connecting radiating veins 34. The pump cylinder 33 is provided with an intake port 35. In the pump cylinder is a piston 36, to which is connected a piston rod 37. It is understood, of course, that there are six pumps in a six-cylinder engine, and therefore, there are six piston rods 37. These piston rods are connected to cross bars 38, each of which is provided with a pair of rings 39, and the rings are so disposed as to be nested side by side, and between these rings and the stationary crank 40 is a series of ball bearings 41. The crank 40 is formed separate from, but is rigidly connected to the shaft section 21 so that it is held from movement by the means which holds the shaft 17 stationary. At the right-hand end of the crank 40, there is an inwardly extending member provided with a bearing 42. This bearing extends into a recess in the member 43 and a ball bearing 44 is placed between the bearing on the end of the crank 40 and the member 43. The member 43 is secured to the end of the sleeve shaft 45, which in turn is rigidly connected to the engine casing so that the sleeve shaft is rotated with the engine casing and power is taken from said sleeve shaft.

The sleeve shaft 45 is in part hollow so as to provide a chamber 46. Surrounding said shaft is a member 47 with which the carburetor 4 is connected through a pipe 48 so that the fuel gases are led from the pipe 48 to the chamber 46. Located within the casing is a stationary ported controlling member 49. This member is held from rotation by means of pins 50 and 51 carried by a disk 52 fixed to the end of the shaft 40. Ball bearings 53 are placed between this ported member 49 and the sleeve shaft 45.

The rotating casing is provided with a series of ports 54 and pipes 55 lead from these ports 54 to the pump intake ports 35. There is a single port 56 in the ported member 49 which is at times brought into register with the ports 54, and thus connects the pump cylinder with the passage 46 and the carburetor. Said ported member 49 therefore, serves as the controlling member for cutting the pump cylinders off from the fuel supply, but also serves as a means for connecting the pump cylinders with the fuel supply at the proper time when the pump is about to draw in a charge.

Located in the pump piston 36 is a by-pass port 57. This by-pass port opens at 58 and 59 through the outer wall of the piston. Between the openings 58 and 59 there is a portion 60 which aids in the controlling of the intake port. The pump cylinder is provided with a by-pass port 61.

Each pair of twin cylinders is preferably provided with two spark plugs 62 and 63 and suitable wires connect these spark plugs with the brushes 64 and 65 which in turn cooperate with a commutator 66.

Figure 3:
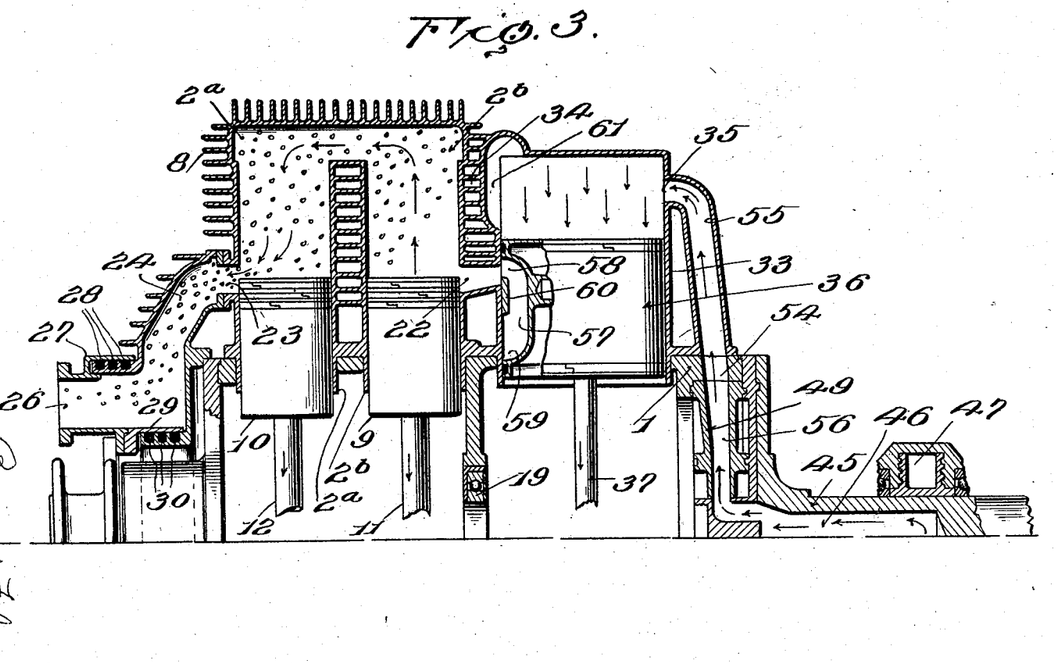
Fig. 3 is a view more or less diagrammatic in section through one pair of cylinders and the pumps associated therewith and showing the pistons at the point where the burnt gases are being released.
Figure 4:
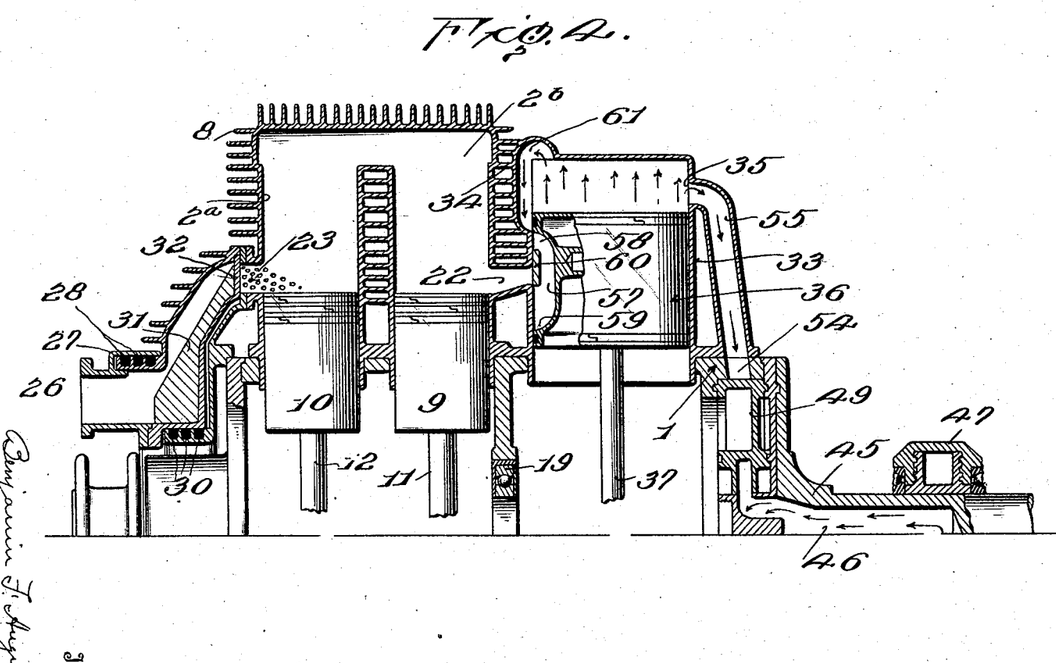
Fig. 4 is a similar view but showing the cylinders completely scavenged and the intake port just about to be uncovered.
Figure 5:
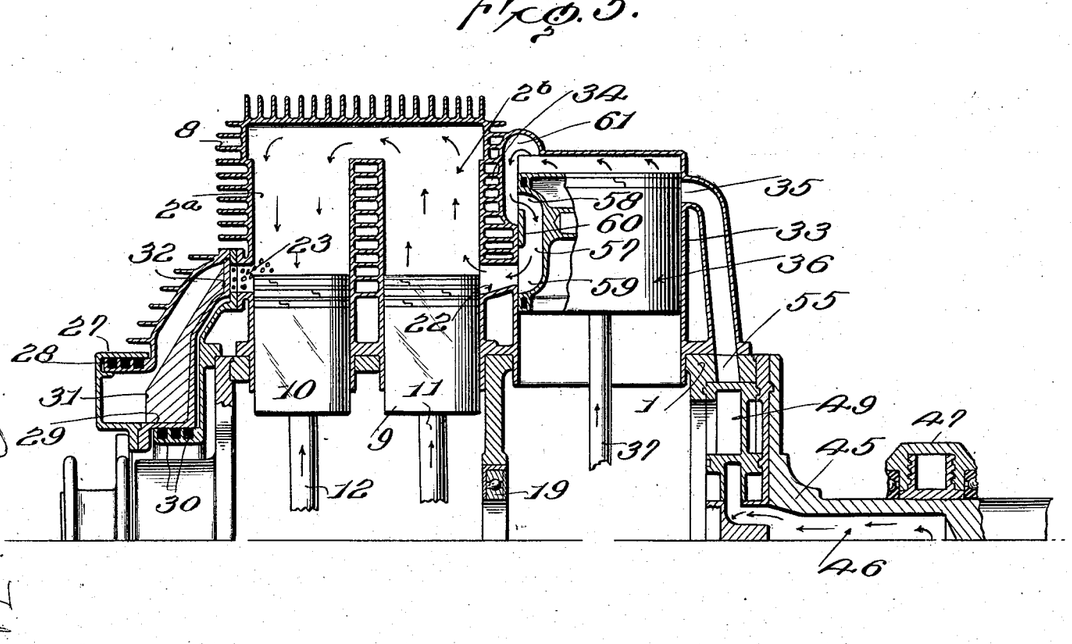
Fig. 5 is a similar view but showing the cylinders as having been fully charged.

I will describe the operation of my engine by reference to Figures 3 to 6, inclusive, which show the pistons in the various positions which they take during the cycle of operation. In Fig. 3, the pistons are on their downward movement relative to the engine cylinder, and have just opened the exhaust port, so as to relieve the exhaust gases. In other words, the expansion stroke has just been completed. It will be noted that the intake port 22 is uncovered by the piston 9 but said intake port is still covered by the piston 36 of the pump so that no fuel gas is yet supplied to the cylinders. The exhaust port is so disposed preferably that it begins to open at about sixty degrees before the piston controlling the same reaches the end of its inner stroke. At this time, the controlling ring 32 is so positioned that the gases may pass freely out through the opening therein. The area of the exhaust ports is of ample capacity to relieve the cylinders of the exhaust gases which are under slight pressure almost instantly, and the rapid rushing of the exhaust gases out through the exhaust ports when they are opened, scavenges the cylinder, and as a matter of fact, produce a partial vacuum therein. The pump pistons are timed substantially ninety degrees in advance of the engine pistons, and therefore, when the engine piston reaches the position shown in Fig. 3, the pump piston associated therewith has completed its stroke and is just about to move upwardly. By the time the piston 9 has completely uncovered the intake port 22, the pump piston has reached the position shown in Fig. 4, the ring 32 has closed the exhaust port, and the by-pass 57 is just about to connect the chamber at the outer end of the pump cylinder with the engine cylinders and permit the gases in the pump to be transferred into the engine cylinders. Up to this point, the pump piston has very slightly compressed the fuel gases in the pump cylinder for the reason that the ports leading to and from each pump cylinder are relatively large, which provides ample clearance so as to avoid excessive pressure of the gases. As soon as the intake port is opened, the gases are transferred into the cylinders by the continued movement of the pump piston. The gases are, therefore, transferred into the cylinder under comparatively light pressure and continuously during the entire intake period, that is, the remaining time that the intake ports are uncovered by the piston. In Fig. 5 of the drawings, I have shown the piston on its return stroke, and just about to cut off the intake port. It will be noted that the piston of the pump closes the intake port 35 for the pump before the intake port leading to the engine cylinders is closed. The pump, therefore, not only works under low pressure, but there is no loss through pumping under pressure, that is, due to the compression and expansion of the gases before they are transferred to the cylinders. Furthermore, by closing the pump intake port 35 before the intake port to the cylinders is closed, I relieve the ported cut-off controlling member 49 from back pressure of the fuel gases.

Figure 6:
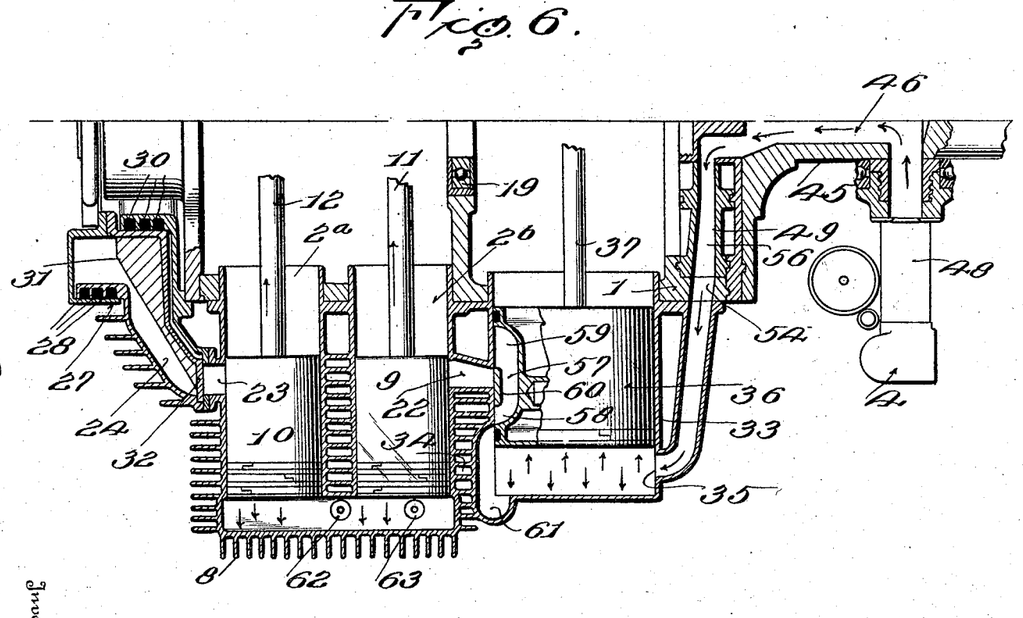
Fig. 6 is a similar view but showing the gases compressed and ready for firing.
Figure 7:
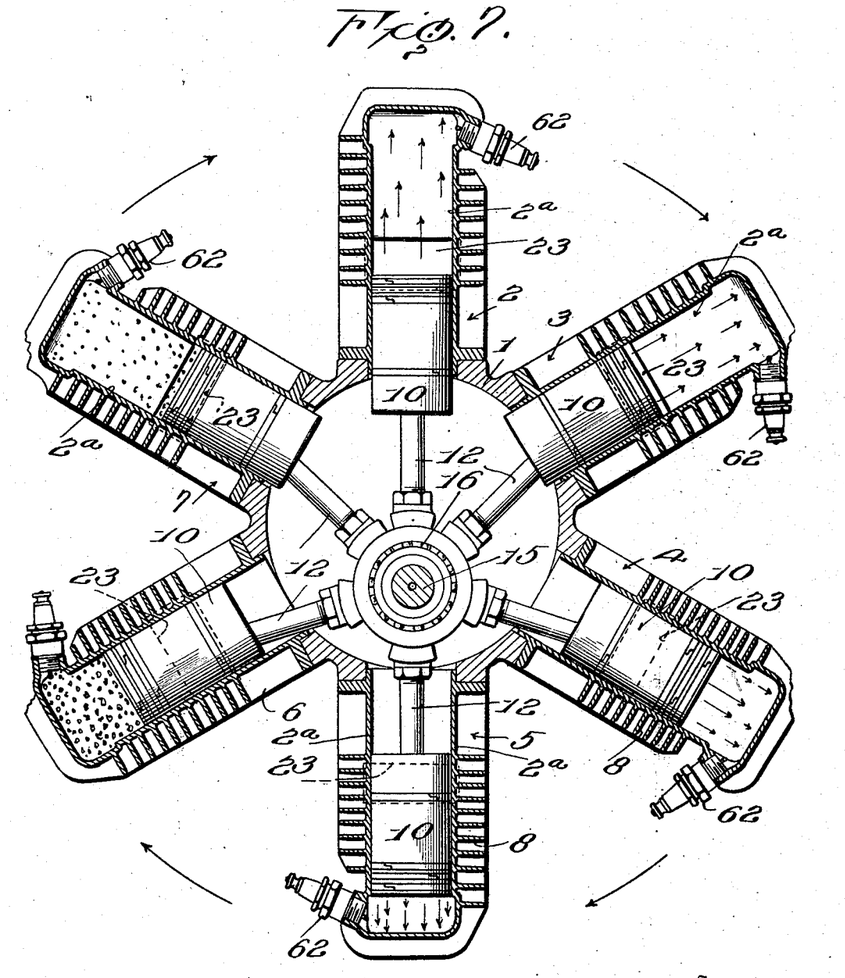
Fig. 7 is a diagrammatic view transversely through the engine showing the several cylinders and the relative conditions in the cycle of operation.

In Fig. 6 of the drawings, I have shown the fuel gases as compressed and the pistons at the point ready for the ignition of the gases and the expansion stroke.

From the above it will be apparent that I have provided a gas engine of the two-cycle type wherein intake and compression occurs on the out-stroke of the piston and expansion and exhaust occurs on the in-stroke of the piston. It will be understood, of course, I mean by the stroke of the piston, the relative movements of the piston and cylinder, as in a rotary type of engine shown in the drawings, the pistons do not have any radial movement. The intake port is closed during substantially the entire period of exhaust, and this prevents any possible waste of the fuel gases and also prevents any premature explosions of the fuel gases when they enter the cylinders. The exhaust port is closed when the fuel gases are transferred to the cylinders, and this prevents any over-running of the fuel gases and consequent waste thereof. It may be, under certain conditions, desirable to open the intake port just slightly before the exhaust port is closed, so that the incoming gases may aid in a complete scavenging of the engine cylinders, but under all conditions, the intake ports are closed during the greater portion of the time that the exhaust port is open and the exhaust port is closed during a greater portion of the time that the intake port is open.

The pump is so proportioned as to supply substantially the maximum required charge for the cylinders under full load and slightly in excess thereof, so that under all atmospheric conditions, a full charge may be transferred to the cylinders. The capacity of the pump, however, is substantially the same as that of the cylinders so that the engine responds quickly to the throttle, that is to say, at each stroke of the pump substantially the entire charge contained in the pump is transferred to the cylinders, so that when the throttle cuts down the supply, the engine responds immediately thereto.

The by-pass port 57 in the pump piston is directly in rear of the portion 60 of the wall of the piston which covers the intake port, so that the gases in this by-pass port 57 are heated and thoroughly vaporized as they pass to the engine cylinders.

It will be noted that the bypass port 61 above referred to, is at the end of the pump cylinder, and the outer wall of this bypass port is formed integral with the radiating vanes between the pump cylinder and the engine cylinder. This bypass port functions to catch all the liquid fuel that comes into the pump which is not vaporized and holds it by centrifugal force, and the fins or radiating vanes 34 will conduct heat from the engine cylinder to the pump cylinder, so that the walls of this by pass 61 become very hot and this results in gasifying the fuel trapped therein so that it will pass on with the vaporized fuel into the engine.

Figures 1, 8:
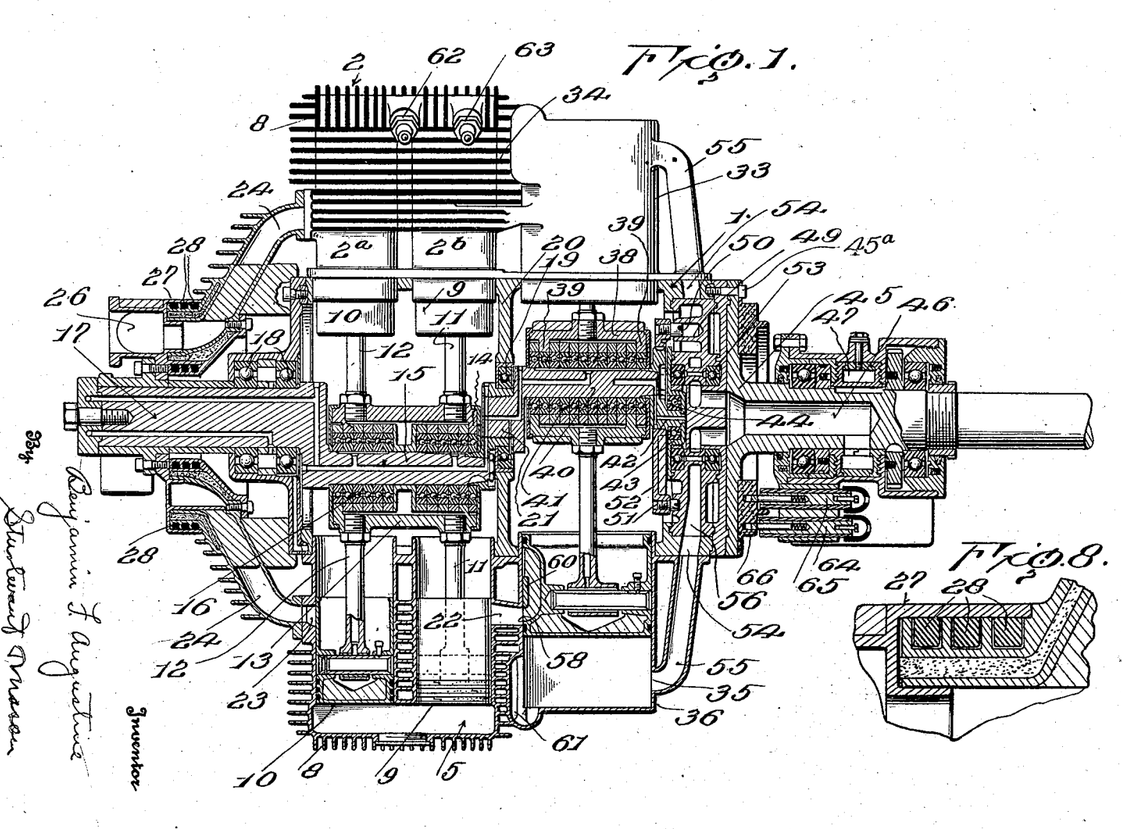
Figure 1 is a view partly in longitudinal section and partly in side elevation showing an engine embodying my improvements.
Fig. 8 is a detail in section showing the sealed connection between the rotating part of the exhaust chamber and the stationary part of the engine.

It will be noted from Fig. 1 that the sleeve shaft 45 is radially enlarged and the engine casing is secured to this sleeve shaft by bolts $45^a$. There are six of these bolts, equally spaced angularly about the shaft. The engine may be quickly removed from its support by removing these bolts and disconnecting the engine casing from said sleeve shaft 45. It will be noted that this can be done without disturbing the gas connection to the carburetor or the electrical connections. As a result, the engine is especially adapted for use in automobiles or for moving vehicles, and when repairs are needed, the engine casing may be removed with all the parts associated therewith and another substituted therefor, if desired, so that the moving vehicle is not laid up during repairs.

It will be noted from Fig. 2 that the flanges or ribs $24^a$ extend toward the axis of the rotating engine casing to the annular circle of the cut-off so that these ribs in between the several cylinders prevent the exhaust from one cylinder passing into another.

While I have described my improvements as embodied in an engine of the rotary radial cylinder type, it will be understood that from certain aspects the invention may also be embodied in an engine where the cylinders do not rotate. Likewise, the invention may be embodied in an engine having a single cylinder instead of the twin cylinders. Then again, while I have described the pump associated with each pair of cylinders, which is of the reciprocating piston type, it will be obvious that from the broad aspect of the invention, other types of pumps may be used. It is to be understood that the broad invention is directed to a construction and arrangement of parts in a two-cycle engine wherein there is a distinct division line between the exhaust period and the intake period and wherein the intake and compression occurs on one stroke of the piston and the exhaust and expansion on the other stroke of the piston. This, in effect, divides the cycle of the two-cycle engine into separate and distinct periods similar to the results obtained in the four-cycle engine.

It is also obvious that minor changes in the details of construction and the arrangement of the parts may be made without departing from the spirit of the invention as set forth in the appended claims.

Having thus described the invention, what I claim as new and desire to secure by Letters Patent, is—

1. A two-cycle gas engine including in combination, a cylinder and a piston, said piston and cylinder having a movement relative to each other, single means outside of the cylinder and associated therewith for forcibly supplying the cylinder with the entire charge of fuel gases continuously and at relatively low pressure during the entire intake period, and means whereby intake and compression occur on one stroke of the piston and expansion and exhaust occur on the other stroke of the piston.

2. A two-cycle gas engine including in combination, a cylinder and a piston, said piston and cylinder having a movement relative to each other, single means outside of the cylinder and associated therewith for forcibly supplying the cylinder with the entire charge of fuel gases continuously and at relatively low pressure during the entire intake period, and means whereby intake occurs substantially after the burnt gases have been exhausted from the cylinder.

3. A two-cycle gas engine including in combination, a pair of twin cylinders, a piston for each cylinder, said pistons and cylinders having movement relative to each other, single means outside of the cylinder and associated therewith for forcibly supplying the cylinders with a supercharge of fuel gases, continuously and at relatively low pressure during the intake period, and means whereby intake and compression occur on one stroke of the piston and expansion and exhaust occur on the other stroke of the piston.

4. A two-cycle gas engine including in combination, a pair of twin cylinders, a piston for each cylinder, said pistons and cylinders having movement relative to each other, single means outside of the cylinder and associated therewith for forcibly supplying the cylinders with an excess of fuel gases, continuously and at relatively low pressure during the intake period, and means whereby intake occurs substantially after the burnt gases have been exhausted from the cylinder.

5. A two-cycle gas engine including in combination, a rotatable casing, a plurality of radially disposed cylinders carried by said casing, a fixed crank, a power piston for each cylinder, and a piston rod for each piston connected with said crank, and means cooperating with said power pistons to close one cylinder port while the other cylinder port is open whereby intake and compression occur in each cylinder on one stroke of the piston associated therewith, and expansion and exhaust occur on the other stroke of the piston.

6. A two-cycle gas engine including in combination, a rotatable casing, a plurality of radially disposed cylinders carried by said casing, a fixed crank, a power piston for each cylinder, and a piston rod for each piston connected with said crank, means cooperating with said power pistons to close one cylinder port while the other cylinder port is open whereby intake and compression occur in each cylinder on one stroke of the piston associated therewith and expansion and exhaust occur on the other stroke of the piston, and means whereby said cylinders are fired in succession as the casing rotates.

7. A two-cycle gas engine including in combination, a rotatable casing, a plurality of radially disposed cylinders carried by said casing, a fixed crank, a power piston for each cylinder, and a piston rod for each piston connected with said crank, and means cooperating with said power pistons to close one cylinder port while the other cylinder port is open whereby intake occurs in each cylinder substantially after the burnt gases have been exhausted from the cylinder.

8. A two-cycle gas engine including in combination, a rotatable casing, a plurality of radially disposed cylinders carried by said casing, a fixed crank, a power piston for each cylinder, a piston rod for each piston connected with said crank, means cooperating with said power pistons to close one cylinder port while the other cylinder port is open whereby intake occurs in each cylinder substantially after the burnt gases have been exhausted therefrom, and means for firing the cylinders in succession.

9. A two-cycle gas engine including in combination, a rotatable casing, a plurality of radially disposed cylinders carried thereby, a piston for each cylinder, a stationary crank, a piston rod for each piston connected to said crank, means outside of the cylinder and associated therewith for forcibly supplying said cylinders with an excess of carbureted fuel gases continuously and at relatively low pressure during the entire intake period of the respective cylinders, and means whereby intake and compression occur in each cylinder on one stroke of the piston associated therewith and expansion and exhaust occur on the other stroke of said piston.

10. A two-cycle gas engine including in combination, a rotatable casing, a plurality of radially disposed cylinders carried thereby, a piston for each cylinder, a stationary crank, a piston rod for each piston connected to said crank, means outside of the cylinder and associated therewith for forcibly supplying said cylinders with an excess of carbureted fuel gases continuously and at relatively low pressure during the entire intake period of the respective cylinders, and means whereby intake occurs in each cylinder substantially after the burnt gases have been exhausted from the cylinder.

11. A two-cycle gas engine including in combination, a rotatable casing, a plurality of radially disposed cylinders carried thereby, a piston for each cylinder, a stationary crank, a piston rod for each piston connected to said crank, means outside of the cylinder and associated therewith for forcibly supplying said cylinders with an excess of carbureted fuel gases continuously and at relatively low pressure during the entire intake period of the respective cylinders, means whereby intake occurs in each cylinder substantially after the burnt gases have been exhausted from the cylinder, and means for firing the cylinders in succession as the casing rotates.

12. A two-cycle gas engine including in combination, a rotatable casing, a plurality of radially disposed twin cylinders carried thereby, said twin cylinders being connected at their outer ends, one of said cylinders having an intake port, pistons in said cylinders, a stationary crank, and piston rods connecting the pistons to the stationary crank, and means independent of the piston for closing the intake port uncovered by the piston during the expansion stroke of the piston.

13. A two-cycle gas engine including in combination, a rotatable casing, a plurality of radially disposed twin cylinders carried thereby, said twin cylinders being connectd at their outer ends, one of said cylinders having an intake port, pistons in said cylinders, a stationary crank, piston rods connecting the pistons to the stationary crank, means cooperating with the piston but independent thereof for maintaining the intake port closed during the entire expansion stroke of the piston, means associated with each twin cylinder for supplying fuel gases thereto continuously and at relatively low pressure during the entire intake period, and means for firing said twin cylinders in succession as the casing rotates.

14. A two-cycle gas engine including in combination, a rotatable casing, a plurality of radially disposed twin cylinders carried thereby, said twin cylinders being connected at their outer ends, one of said cylinders having an intake port, pistons in said cylinders, a stationary crank, piston rods connecting the pistons to the stationary crank, means independent of the piston for closing the intake port uncovered by the piston during the expansion stroke of the piston, and means associated with each twin cylinder for supplying fuel gases thereto continuously and at relatively low pressure during the entire intake period.

15. A two-cycle gas engine including in combination, a rotatable casing, a plurality of radially disposed twin cylinders carried thereby, said twin cylinders being connected at their outer ends, one of said cylinders having an intake port, pistons in said cylinders, a stationary crank, piston rods connecting the pistons to the stationary crank, means independent of the piston for closing the intake port uncovered by the piston during the expansion stroke of the piston, means associated with each twin cylinder for supplying fuel gases thereto continuously and at relatively low pressure during the entire intake period, and means for firing said cylinders in succession as the casing rotates.

16. A rotary gas engine including in combination, a rotatable casing, a plurality of radially disposed twin cylinders carried by said rotatable casing, one of said twin cylinders having an intake port and the other an exhaust port, a piston for each cylinder, said ports being disposed so as to be uncovered by the pistons, and means independent of the pistons and cooperating therewith whereby said intake port is closed during the expansion stroke and the exhaust port is closed during the compression stroke of the pistons.

17. A rotary gas engine including in combination, a rotatable casing, a plurality of radially disposed twin cylinders carried by said rotatable casing, one of said twin cylinders having an intake port and the other an exhaust port, a piston for each cylinder, said ports being disposed so as to be uncovered by the pistons, means for maintaining the intake port closed while the exhaust port is open, and means for closing the exhaust port while the intake port is open.

18. A rotary gas engine including in combination, a rotatable casing, a plurality of radially disposed twin cylinders, carried by said rotatable casing, one of said twin cylinders having an intake port and the other an exhaust port, a piston for each cylinder, said ports being disposed so as to be uncovered by the pistons. means independent of the pistons and cooperating therewith whereby said intake port is closed during the expansion stroke and the exhaust port is closed during the compression stroke of the pistons, and means associated with each of the twin cylinders for supplying fuel gases continuously and at relatively low pressure to the cylinders during the entire intake period.

19. A rotary gas engine including in combination, a rotatable casing, a plurality of radially disposed twin cylinders carried by said rotatable casing, one of said twin cylinders having an intake port and the other an exhaust port, a piston for each cylinder, said ports being disposed so as to be uncovered by the pistons, means independent of the pistons and cooperating therewith whereby said intake port is closed during the expansion stroke and the exhaust port is closed during the compression stroke of the pistons, means associated with each of the twin cylinders for supplying fuel gases continuously and at relatively low pressure to the cylinders during the entire intake period, and means for firing the cylinders in succession as the casing rotates.

20. A rotary gas engine including in combination, a rotatable casing, a plurality of radially disposed twin cylinders carried by said rotatable casing, one of said twin cylinders having an intake port and the other an exhaust port, a piston for each cylinder, said ports being disposed so as to be uncovered by the pistons, means for maintaining the intake port closed while the exhaust port is open, means for closing the exhaust port while the intake port is open, and means associated with each of the twin cylinders for supplying said cylinders with fuel gases continuously and at relatively low pressure during the entire intake period.

21. A rotary gas engine including in combination, a rotatable casing, a plurality of radially disposed twin cylinders carried by said rotatable casing, one of said twin cylinders having an intake port and the other an exhaust port, a piston for each cylinder, said ports being disposed so as to be uncovered by the pistons, means for maintaining the intake port closed while the exhaust port is open, means for closing the exhaust port while the intake port is open, means associated with each of the twin cylinders for supplying said cylinders with fuel gases continuously and at relatively low pressure during the entire intake period, and means for firing said cylinders in succession as the casing rotates.

22. A gas engine including in combination, a cylinder having an intake port, a piston adapted to uncover said intake port at the inner end of its stroke, a pump including a cylinder connected to said intake port, and a pumping member having a by-pass port therein adapted to cover the intake port while said piston of the engine cylinder is on its expansion stroke and adapted to connect the pump cylinder with the intake port while the intake port is open on the compression stroke of the engine cylinder piston, the capacity of the pump cylinder being greater than the capacity of the cooperating power cylinders, permitting a supercharging of said power cylinders.

23. A gas engine including in combination, a cylinder having an intake port, a piston adapted to uncover said intake port at the inner end of its stroke, a pump cylinder connected with said intake port, a reciprocating pump piston having a by-pass port therein adapted to cover the intake port while the same is uncovered by the piston on its expansion stroke and to connect the pump cylinder with the intake port while the intake port is open on the compression stroke of the engine piston, the capacity of the pump cylinder being greater than the capacity of the cooperating power cylinders, permitting a supercharging of said power cylinders.

24. A gas engine including in combination, a cylinder having an intake port, a piston adapted to uncover said intake port at the inner end of its stroke, a pump cylinder connected with said intake port, a reciprocating pump piston having a by-pass port therein adapted to cover the intake port while the same is uncovered by the piston on its expansion stroke and to connect the pump cylinder with the intake port while the intake port is open on the compression stroke of the engine piston, said pump cylinder having an intake port adapted to be covered by the piston before the intake port of the engine cylinder is closed.

25. A gas engine including in combination, twin cylinders, one of which has an intake port and the other an exhaust port, pistons for said cylinders adapted to uncover the intake and exhaust ports, respectively, at the inner ends of their strokes, a pump cylinder connected with said intake port, a pump piston having a by-pass port disposed so that said pump piston covers the intake port while the intake port is uncovered by the piston on its expansion stroke, said by-pass port in the pump piston connecting the pump cylinder with the intake port while said intake port is uncovered by the piston of the engine cylinder.

26. A gas engine including in combination, twin cylinders, one of which has an intake port and the other an exhaust port, pistons for said cylinders adapted to uncover the intake and exhaust ports, respectively, at the inner ends of their strokes, a pump cylinder connected with said intake port, a pump piston having a by-pass port disposed so that said pump piston covers the intake port while the intake port is uncovered by the piston on its expansion stroke, said by-pass port in the pump piston connecting the pump cylinder with the intake port while said intake port is uncovered by the piston of the engine cylinder, and means independent of the pistons for closing the exhaust port while said intake port is uncovered by the pump piston.

27. A gas engine including in combination, twin cylinders, one of which has an intake port and the other an exhaust port, pistons for said cylinders adapted to uncover the intake and exhaust ports, respectively, at the inner ends of their strokes, a pump cylinder connected with said intake port, a pump piston having a by-pass port disposed so that said pump piston covers the intake port while the intake port is uncovered by the piston on its expansion stroke, said by-pass port in the pump piston connecting the pump cylinder with the intake port while said intake port is uncovered by the piston of the engine cylinder, said pump cylinder having an intake port disposed so as to be covered by the pump piston prior to the closing of the intake port.

28. A gas engine including in combination, twin cylinders, one of which has an intake port and the other an exhaust port, pistons for said cylinders adapted to uncover the intake and exhaust ports, respectively, at the inner ends of their strikes, a pump cylinder connected with said intake port, a pump piston having a by-pass port disposed so that said pump piston covers the intake port while the intake port is uncovered by the piston on its expansion stroke, said by-pass port in the pump piston connecting the pump cylinder with the intake port while said intake port is uncovered by the piston of the engine cylinder, means independent of the pistons for closing the exhaust port while said intake port is uncovered by the pump piston, said pump cylinder having an intake port disposed so as to be covered by the pump piston before said intake port to the engine cylinder is closed.

29. A gas engine including in combination, a casing adapted to rotate, a plurality of radially disposed cylinders carried by said casing, a pump piston associated with each cylinder, a port extending from the pump cylinder to the engine cylinder, a piston in the engine cylinder adapted to uncover said port, a piston in the pump cylinders adapted to cover said port and having a by-pass port formed therein whereby the port is in open communication with the pump cylinder only while said port is uncovered by the piston on its compression stroke, the capacity of the pump cylinder being greater than the capacity of the cooperating power cylinders, permitting a supercharging of said power cylinders.

30. A gas engine including in combination, a casing adapted to rotate, a plurality of radially disposed cylinders carried by said casing, a pump piston associated with each cylinder, a port extending from the pump cylinder to the engine cylinder, a piston in the engine cylinder adapted to uncover said port, a piston in the pump cylinders adapted to cover said port and having a by-pass port formed therein whereby the port is in open communication with the pump cylinder only while said port is uncovered by the piston on its compression stroke, said pump cylinder having an intake port adapted to be covered by said piston of the pump before the port leading to the engine cylinder is closed.

31. A gas engine including in combination, a rotatable casing, a plurality of radially disposed cylinders carried by said casing, said cylinders being arranged in pairs and connected at their outer ends, a piston for each cylinder, one of said cylinders having an intake port and the other cylinder having an exhaust port, said ports being uncovered by the pistons at the inner ends of their strokes, a pump cylinder associated with each pair of engine cylinders and having direct connection with the intake port, a piston for the pump cylinder adapted to cover the intake port while the engine piston uncovers the same on its expansion stroke, said pump piston having a by-pass port for connecting the pump cylinder with the engine cylinder while said intake port is open on the compression stroke of the engine piston, the capacity of the pump cylinder being greater than the capacity of the coperating power cylinders, permitting a supercharging of said power cylinders.

32. A gas engine including in combination, a rotatable casing, a plurality of radially disposed cylinders carried by said casing, said cylinders being arranged in pairs and connected at their outer ends, a piston for each cylinder, one of said cylinders having an intake port and the other cylinder having an exhaust port, said ports being uncovered by the pistons at the inner ends of their strokes, a pump cylinder associated with each pair of engine cylinders and having direct connection with the intake port, a piston for the pump cylinder adapted to cover the intake port while the engine piston uncovers the same on its expansion stroke, said pump piston having a by-pass port for connecting the pump cylinder with the engine cylinder while said intake port is open on the compression stroke of the engine piston, said pump cylinders having an intake port adapted to be covered by the pump piston prior to the closing of the intake port leading to the engine cylinder.

33. A gas engine including in combination, a rotatable casing, a plurality of radially disposed cylinders carried by said casing, said cylinders being arranged in pairs and connected at their outer ends, a piston for each cylinder, one of said cylinders having an intake port and the other cylinder having an exhaust port, said ports being uncovered by the pistons at the inner ends of their strokes, a pump cylinder associated with each pair of engine cylinders and having direct connection with the intake port, a piston for the pump cylinder adapted to cover the intake port while the engine piston uncovers the same on its expansion stroke, said pump piston having a by-pass port for connecting the pump cylinder with the engine cylinder while said intake port is open on the compression stroke of the engine piston, and means independent of the pistons for closing the exhaust port during the compression stroke of the pistons.

34. A gas engine including in combination, a rotatable casing, a plurality of radially disposed cylinders carried by said casing, said cylinders being arranged in pairs and connected at their outer ends, a piston for each cylinder, one of said cylinders having an intake port and the other cylinder having an exhaust port, said ports being uncovered by the pistons at the inner ends of their strokes, a pump cylinder associated with each pair of engine cylinders and having direct connection with the intake port, a piston for the pump cylinder adapted to cover the intake port while the engine piston uncovers the same on its expansion stroke, said pump piston having a by-pass port for connecting the pump cylinder with the engine cylinder while said intake port is open on the compression stroke of the engine piston, and a shaft fixed to said rotating casing and having a passageway for the fuel supply, and a stationary ported controlling member for connecting the pumps in succession with said supply as the engine rotates.

35. A gas engine including in combination, a rotating casing, a plurality of twin cylinders radially disposed carried by and projecting from said casing, a pump cylinder associated with each of the twin cylinders carried by and projecting from said casing, said pump cylinder and said engine cylinders being cast together and separated from each other to permit a free circulation of air between the cylinders, said pump cylinders having an intake port adjacent its outer end, a pipe for each intake port extending to and connecting with the casing, a stationary ported member within the casing connected with the supply and disposed so as to connect said pumps in succession with the supply.

36. A gas engine including in combination, a rotating casing, a plurality of radially disposed cylinders, said casing having an exhaust chamber connected with the exhaust ports, a stationary member for receiving the exhaust gases having portions overlying the casing containing the exhaust chamber, said casing having a series of grooves facing outwardly against the overlying stationary members, and expansible sealing rings freely located in said grooves whereby the rings engage the stationary member and are held from rotation as the engine rotates.

37. A gas engine including in combination, a rotating casing, a plurality of radially disposed cylinders, a pump cylinder associated with each engine cylinder, radiating fins connecting the pump cylinder and engine cylinders, said pump cylinder having a bypass forming a pocket into which any liquid fuel is carried by centrifugal force, said pocket being disposed on the side of the pump casing adjacent the radiating fins whereby the heat from the engine cylinder will vaporize said fuel.

38. A gas engine including in combination, a rotating casing, a plurality of radially disposed cylinders, a stationary shaft having a fixed crank located within said casing, a rotating shaft in alinement with said stationary shaft, and having a radially extending portion, and means for bolting said radially extending portion of the rotating shaft to the casing.

39. A gas engine including in combination, a rotating casing, a plurality of radially disposed cylinders, a stationary shaft having a fixed crank located within said casing, a rotating shaft having the engine ignition distributing device mounted thereon, said rotating shaft being in alinement with said stationary shaft, and having a radially extending portion, and means for bolting said radially extending portion of the rotating shaft to the casing, said rotating shaft having a fuel passage therethrough leading to the engine carburetor, and electrical distributing devices supported by said rotating shaft.

40. A gas engine including a rotating casing having a plurality of radially disposed cylinders, said cylinders having exhaust ports, a stationary chamber adapted to receive the exhaust gases from the exhaust port, said cylinders having inwardly extending ribs for preventing the exhaust gases from passing from one cylinder into another.

41. A rotary gas engine including a casing, a plurality of pairs of radially disposed power cylinders, a plurality of supercharging pump cylinders, arranged one for each pair of power cylinders, a carburetter, a hollow sleeve shaft connecting said carburetter with each pump cylinder, and means associated with each pair of power cylinders permitting each of said pump cylinders to supply the respective power cylinders with pre-heated fuel gas continuously and at a relatively low pressure during the entire intake period.

In testimony whereof, I affix my signature.

BENJAMIN FRANKLIN AUGUSTINE.